United States Patent
Bresler

[15] 3,639,231
[45] Feb. 1, 1972

[54] DESALINATION PROCESS
[72] Inventor: Sidney A. Bresler, New York, N.Y.
[73] Assignee: Bresler and Associates Inc., New York, N.Y.
[22] Filed: Nov. 13, 1970
[21] Appl. No.: 89,429

[52] U.S. Cl. ...................................210/23, 210/30, 210/259
[51] Int. Cl. ....................................B01d 13/00, B01d 15/04
[58] Field of Search.....................210/22, 23, 26, 30, 37, 38, 210/259, 321

[56] References Cited

UNITED STATES PATENTS

| | | | |
|---|---|---|---|
| 3,526,320 | 9/1970 | Kryzer | 210/321 X |
| 2,606,870 | 8/1952 | Pemberton et al. | 210/26 |
| 2,841,550 | 7/1958 | Beohner | 210/26 |

*Primary Examiner*—Samin N. Zaharna
*Attorney*—Flynn & Frishauf

[57] ABSTRACT

Brackish water is desalinated by contacting it with one or more ion exchange resins followed by reverse osmosis. Brine rejected in reverse osmosis treatment can be used to regenerate a used ion exchange resin.

Figure 3:
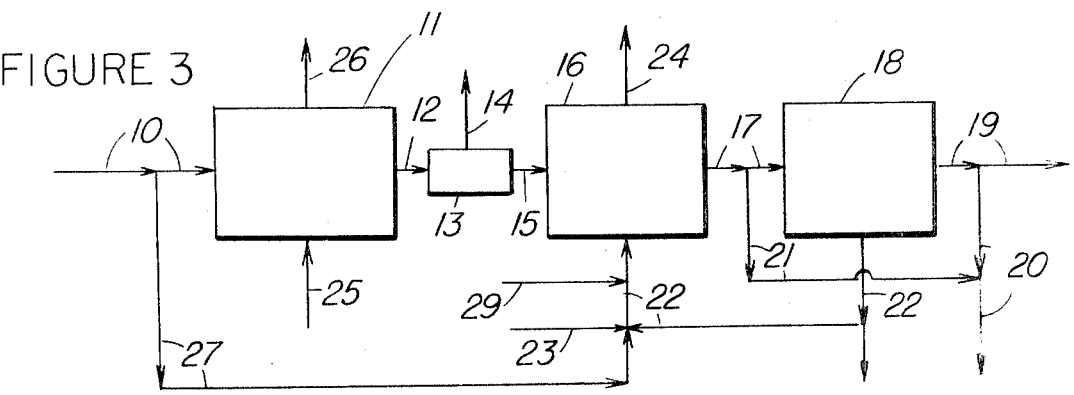

12 Claims, 3 Drawing Figures 3,639,231

DESALINATION PROCESS

FIELD OF INVENTION

This invention has to do with a process for desalting a salt-containing water such as a brackish water.

BACKGROUND OF THE INVENTION

Various processes may be used to reduce the dissolved solids contents of a salt-containing water to the level at which the water is suitable for drinking or for industrial use such as cooling tower makeup. Such processes include ion exchange, reverse osmosis, electrodialysis, evaporation (multiple-effect or multiple-staging), vacuum freeze, and vapor compression. The first three of these processes may be most suitable for treating a brackish water (containing less than 10,000 parts per million of total dissolved solids), while the others may be most suitable for treating more concentrated solutions such as sea water (33,000 p.p.m.).

Although not the optimum process for desalting brackish water in all instances, the reverse osmosis method offers certain advantages. Reverse osmosis involves the use of a semipermeable membrane which, under the application of pressure to a feed stream, permits passage of water molecules but holds back all or part of the undesired solute in the feed stream. Unlike ion exchange, the cost of chemicals for regeneration is minimized. Unlike electrodialysis, reverse osmosis does not require relatively large amounts of direct-current electric power and its effectiveness is not as sensitive to the temperature of the feedwater.

In any desalination process, the brackish feedwater is brought to a desalination plant, where it is separated into essentially two streams. One stream consists of product water, which is relatively pure. The second, or waste, stream contains the bulk of the dissolved solids. It is usually desired that this waste stream be as concentrated as possible, for three reasons. First, the disposition of such a waste stream frequently is costly, with the cost being related more to the quantity of liquids to be disposed of rather than to the amount of dissolved material. Furthermore, the means for such disposal, such as the introduction of the waste stream into a deep aquifer, may be limited. Second, the total supply of brackish water may be limited. If the dissolved solids can be concentrated into a smaller stream, the amount of resultant demineralized water will be increased. Third, this waste stream is a potential source of valuable salts and minerals. As the concentration of this waste stream is increased, the cost of mineral recovery is decreased.

There is a limit to the degree of concentration of dissolved solids which can be produced in the waste stream. If this limit is exceeded, the concentrated solids will precipitate out of the solution. This precipitated material will tend to deposit on a transfer surface which may be employed in the desalination process, such as a reverse osmosis membrane or an ion exchange resin bead, decreasing the material transfer across this surface and increasing the amount of energy required to effect the separation of water from dissolved salts.

When demineralizing most brackish waters, the first salts to precipitate from the concentrated solution are compounds of calcium sulfate or calcium carbonate. If magnesium is present, magnesium hydroxide may form. Other salts such as sodium sulfate, sodium carbonate, calcium chloride and sodium chloride are much more soluble; as are the mineral acids. Under certain conditions, complex compounds of $CaSO_4$ and $Na_2SO_4$ may precipitate.

Two measures which are frequently employed to minimize or to prevent the fouling of the transfer surface by precipitated salts consists of lowering the pH of the solution and adding antiprecipitants. The addition of sufficient amounts of acid will inhibit the formation of calcium carbonate and magnesium hydroxide, and also of iron and aluminum compounds. The calcium sulfate solubility also may be effected. The addition of sodium hexametaphosphate, an organic polyelectrolyte, or similar compounds may inhibit the formation of precipitates and reduce the tendency of those which do form to become attached to the transfer surface. However, these measures are costly; and the efficacy of antiprecipitant usage is not altogether certain.

In general, precipitates and scale will form in a reverse osmosis unit before the saturation level is reached in the bulk liquid stream. This will take place because a salt concentration gradient will be established in what may be considered a boundary layer immediately adjacent to the semipermeable membrane. The "thickness" of the layer, and the degree of salt concentration, is a function of many factors including the physical configuration of the reverse osmosis equipment and also the product flux and the Reynolds number of the bulk fluid. Salt concentrations in this boundary layer may be perhaps twice that in the bulk liquid.

The problem tends to become more severe as membranes are devised which enable one to obtain a higher water flux.

Reducing the boundary layer thickness by increasing the turbulent flow velocity in the bulk liquid stream or introducing turbulance-inducing devices, tends to create an increased pressure drop and increased power costs. Reducing the boundary layer thickness by reducing the flow channel results in increased equipment cost.

It is apparent that the concentration of the waste stream could be increased if changes could be made in the ionic composition of the inlet brackish water—for example, if calcium and/or magnesium radicals were replaced by sodium and/or hydrogen radicals; or if sulfate and/or carbonate radicals were replaced by chloride radicals; or if the least soluble ionic constituents were removed from the inlet water.

Certain ionic constituents can be removed by ion exchange or by lime-soda softening. The disadvantage of the former process is the cost of chemicals needed to regenerate the ion exchange resins. The disadvantage of the latter process is the cost of chemicals which are required (lime and/or soda ash) and the cost of the precipitator and other equipment.

SUMMARY OF THE INVENTION

In accordance with this invention, it has been found that inorganic salts can be removed from an aqueous solution, particularly a brackish water, by contacting the solution with one or more ion exchange resins to remove certain ions from said solution, forcing the resulting solution through a reverse osmosis membrane which rejects salts present in said solution, collecting an aqueous product having an inorganic salt content substantially less than said aqueous solution and an inorganic salt product. The latter product can be used to regenerate the ion exchange resin.

DRAWINGS

Figure 1:
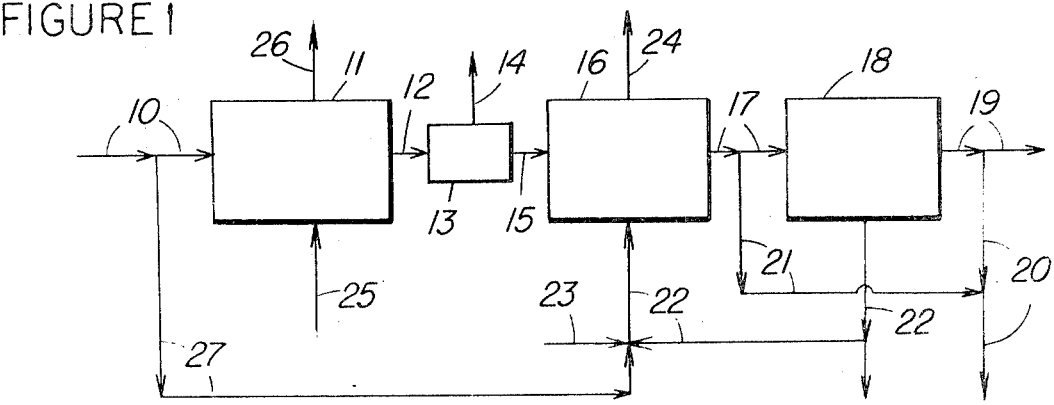
Figure 2:
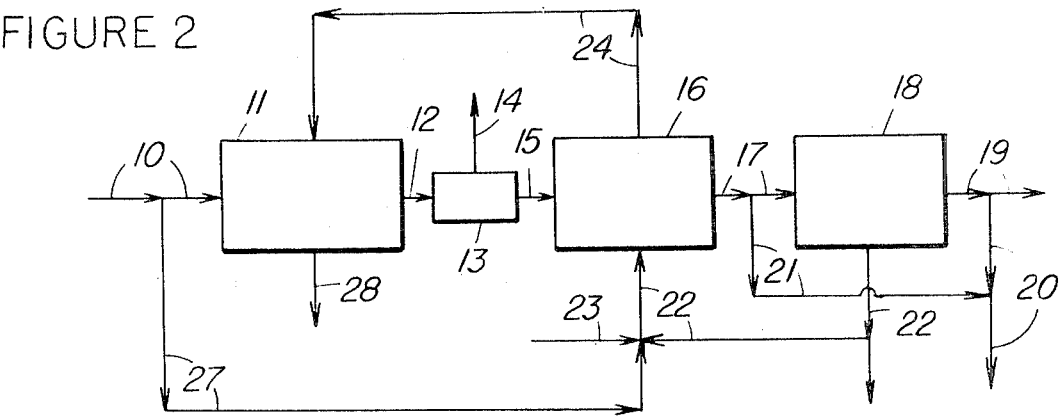

FIGS. 1 through 3 contain flow diagrams illustrating several embodiments of the invention.

SPECIFIC EMBODIMENTS OF THE INVENTION

One technique for removing salts from a brackish water is illustrated by FIG. 1 and involves passing water in line 10 over a bed of a weakly acidic ion exchange resin in vessel 11. Typical of such resins are cross-linked acrylic resins which contain functional carboxylic acid groups and which operate at a pH range of from about 5 to about 14. Examples include Rohm and Haas' IRC-84 and Diamond Shamrock's CC-3. Resin capacity ranges from approximately 5 to 70 kilograins per cubic foot, as $CaCO_3$, in the process of this invention. Bicarbonate present in the brackish water is converted to carbon dioxide and water, and an equivalent amount of calcium and magnesium ions are absorbed on the resin. If the equivalent amount of bicarbonate exceeds that of calcium, magnesium and other divalent or trivalent cations, then some monovalent cations will also be absorbed by the resin.

The effluent from the bed of weakly acidic ion exchange resin is then removed from vessel 11 through line 12 and is passed to degassing vessel 13 such as a tower packed with Raschig rings or the like. Carbon dioxide is removed through line 14. Degassed effluent is passed through line 15 to vessel 16 wherein it is passed over a bed of a strongly acidic ion exchange resin in cation form, particularly in the form of a sodium cation. Typical of such resins are sodium sulfonates of styrene and divinyl benzene copolymer resins which operate within approximate pH limits of 1 to 14. Illustrative examples include Rohm and Haas' Amberlite 200 and Diamond Shamrock's C-20. Resin capacity ranges from approximately 8 to 30 kilograins per cubic foot, as $CaCO_3$, in the processes of this invention. Sodium regenerant requirements range from about 115 percent to about 300 percent of stoichiometric.

Substantially all of the remaining calcium and magnesium ions present in said effluent are absorbed on the strongly acidic ion exchange resin, and an equivalent amount of sodium ions are released into the resulting aqueous solution.

All or a portion of this softened and partially deionized water is removed from vessel 16 through line 17 and is passed to reverse osmosis unit 18, wherein it is further deionized. This unit contains a semipermeable membrane such as Gulf General Atomic's spiral wound units or American Standard's tubular units, which contain cellulose acetate membranes, or duPont's hollow, fine nylon fiber units. Nylon is a superpolymeric amide prepared from aliphatic dicarboxylic acids, such as adipic and sebacic acids and aliphatic diamines such as hexamethylene diamine. Other types of semipermeable membranes and other mechanical configurations also may be employed. Power requirements for such a unit range between about 6 and about 11 kilowatt hours (kw.-hr.) per 1,000 gallons of deionized water.

The deionized water from the reverse osmosis unit or units can be utilized for municipal or industrial purposes as it is delivered therefrom through line 19. Alternatively, if product water specifications so permit, all or a portion of the deionized water (in line 19) from such a unit can be passed through line 20 and blended with the softened and partially deionized water taken from the strongly acidic ion exchange resin bed through line 21.

The concentrated salt solution or brine rejected by the membrane or membranes in a reverse osmosis unit is removed from vessel 18 through line 22 and is passed to unit 16 wherein it is used to regenerate the strongly acidic resin bed therein. A salt such as makeup sodium chloride in line 23 can be added to the concentrated salt solution as an aid in regenerating the resin. In order to minimize sodium regenerant requirements, the strongly acidic resin bed may be regenerated in an area of relatively low capacity but high regenerant efficiency. The regenerant stream removed via line 24 from the resin bed, after contact with the brine, is considered a waste stream, which is disposed of as by injection into a deep aquifer, evaporation system, etc. However, this stream can be processed further for recovery of its constituents.

The weakly acidic ion exchange resin in vessel 11 can be regenerated with sulfuric or other mineral acids in line 25, using approximately 10 percent more acid than stoichiometrically required, as is well known in the art. Regenerant stream is removed from vessel 11 through line 26.

If desired a portion of the water charge can be passed through line 27, or water from any one or more of lines 12, 15, 17 and 19, and combined with brine in line 22 for diluting the concentrated brine.

Therefore, by utilizing an otherwise waste brine stream to regenerate a resin bed, and by using a relatively small amount of acid to regenerate a second resin bed, the cost of extraneous chemicals is reduced substantially.

Modifications of the process described above are contemplated. For example, when the brackish water to be processed contains only a relatively small amount of bicarbonate ion, the initial bed of weakly acidic ion exchange resin in vessel 11 can be omitted. Also when economic considerations dictate, this bed is omitted.

Another modification shown in FIG. 2 involves passing the effluent from the initial bed of weakly acidic ion exchange resin in vessel 11 over a bed of strongly acidic ion exchange resin in the acid form in vessel 16. Typical of the latter resins are Amberlite 200 and C-20, mentioned above. Resin capacity ranges from approximately 5 to 35 kilograins per cubic foot, as $CaCO_3$, in this process. Acid regenerant requirements range from about 115 percent to about 300 percent of stoichiometric, acid being added through line 23. Substantially all of the remaining cations such as calcium, magnesium and sodium, are absorbed on the resin bed in vessel 16, and an equivalent amount of hydrogen ions are released into the solution in line 17. In this process, the reverse osmosis membrane which is employed in vessel 18 is capable of operating in an acid environment; a cellulose acetate of Gulf General Atomic, mentioned above, is suitable for this purpose.

In FIG. 2, the unused acid in line 24 can be passed to vessel 11 to regenerate the weakly acidic ion exchange resin therein. Additional acid can be added to line 24 (not shown). Waste stream 28 is removed from vessel 11 through line 28.

Still another modification involves the use of an anion exchange resin bed in place of a weakly acidic and/or strongly acidic resin bed to remove calcium and magnesium ions. Sulfate ions present in the brackish charge water are absorbed on the anion resin bed and an equivalent amount of chloride ions are released into the resulting solution. This is illustrated in FIG. 3, wherein an anion exchange resin is employed in vessel 16.

Illustrative examples of such resins are Rohm and Haas' IRA-47 and Diamond Shamrock's ES-104. The former is a condensation polymer of epichlorohydrin and a polyamine mixture of diethylene triamine and triethylene tetramine. During the regeneration phase, the pH of solution passed to this resin bed is maintained at about 2-3 by the addition of hydrochloric acid through line 23. The capacity of the resin is approximately 20 kilograins per cubic foot, as $CaCO_3$, and the regenerant requirement is approximately 7 pounds of salt per cubic foot which is charged via line 29.

Resin ES-104 is a strongly basic resin comprising a polystyrene resin containing quaternary ammonium groups. The resin is used at pH values of 1 to 14 and at temperatures below about 100° F. Approximately 10 percent of caustic soda is added to the sodium chloride regenerant solution used in regenerating this resin. The capacity of the resin is approximately 16 kilograins per cubic foot, as $CaCO_3$, and the regenerant requirement is about 6 pounds of NaCl and about 0.4 pound of NaOH per cubic foot.

Rather than utilizing weakly acidic and/or strongly acidic resin beds to remove calcium and magnesium, a strongly basic anion resin bed can be employed. In such case, sulfate and other ions are absorbed on the resin bed and an equivalent amount of hydroxyl ions are released into the solution. Examples of such resins are Rohm and Haas' IRA-40 and Nalco Chemical's Dowex SBR. Each is a styrene and divinyl styrene copolymer resin containing quaternary ammonium groups, and is useful at a pH range of 0 to 14. Resin capacity ranges from approximately 5 to 15 kilograins per cubic foot, as $CaCO_3$. Regenerant requirements range from 1 to 10 pounds of NaOH per cubic foot. In this modification, the reverse osmosis membrane employed is one capable of operating in a basic environment. The nylon membrane of duPont, mentioned above, is suitable.

It is also contemplated that the processing techniques described above can be combined. For example, a portion of the feedwater can be treated by the process illustrated by FIG. 1 and another portion by the process shown by FIG. 2. Product and partially deionized water streams, with the optional addition of untreated feedwater, can be combined to produce water streams having the desired quality.

Ion exchange beds containing the same resin can be used in parallel or in series. Ion exchange can be conducted in fixed or moving beds, and include discontinuous, continuous, or other modes.

Regardless of the composition of the ion exchange bed, the waste or brine stream from a reverse osmosis unit can be used entirely or in part, to regenerate one of the ion exchange beds.

In those instances in which an insufficient amount of chemical regenerant is contained in the waste stream from the reverse osmosis unit, this stream is enriched by the addition of the necessary amounts of chemicals, such as sodium chloride, sulfuric or other acids, or caustic soda or other alkali, as indicated above.

It might appear that the concentration of salts in the effluent regenerant stream from the ion exchange resin bed would be no greater than could be obtained in the brine stream of a reverse osmosis plant, as both are bound by the same solubility equilibrium. However, this is not correct, as the mechanism of ion exchange by the use of resin beads enables one to obtain significantly higher sulfate concentrations, or concentration of other precipitants, in the final effluent. Several procedures may be utilized, such as:

a. Rapid regeneration, with a supersaturated regenerant being removed from the resin bed before sufficient time has elapsed for precipitation to occur.
b. Staged regeneration, with a portion of the calcium (or other) ions removed by a dilute regenerant stream and the balance by a more concentrated stream.
c. Countercurrent regeneration, with the most concentrated calcium (or other) ions removed by the concentrated regenerant stream just before it leaves the ion exchange bed.

These methods are well known in the art, and are not described further.

In some instances as illustrated in FIGS. 1-3, amounts of feedwater, or water from one or more of lines 12, 15, 17 and 19, may be used to dilute the concentrated brine stream from the reverse osmosis unit, before it is used as a regenerant stream.

Temperatures and pressures employed are not critical. Suitable temperatures and pressures are: 60°-120° F. and atmospheric to 150 p.s.i.a.

The invention is illustrated further by the following typical examples.

EXAMPLE 1

This example is shown by FIG. 1. One million gallons per day (1 MGD) of brackish water is charged through line 10. The composition of this water is shown in table I with reference to line 10. The quantities and compositions of streams 15, 17 and 19 are also shown.

The strongly acid resin in vessel 16 is in the sodium form.

Analyses given are approximate. Product water recovery is 90 percent. It may vary from about 50 percent to about 95 percent. Salt rejection is about 95 percent; it may vary from about 50 percent to about 95 percent for monovalent ions such as chlorides, sodium, potassium, nitrate, and bicarbonate, and from about 70 percent to over 99 percent for divalent ions such as calcium, magnesium and sulfate.

EXAMPLE 2

This example is also illustrated by FIG. 1; however, the strongly acidic resin is in the acid form, such as Amberlite 200 in vessel 16. Also, product water in line 19 is blended in line 20 with water in line 17 from vessel 16.

Sulfate ion present in the product in line 19 can be exchanged for chloride ion bypassing all or part of this product over another resin bed such as IRA-47 or ES-104, mentioned above.

The chloride ion and sulfate ion values can be reduced materially by operating reverse osmosis unit 18 to maintain a 50 percent product recovery rather than about 90 percent as shown. Alternatively, product from unit 18 can be passed through a second reverse osmosis unit to reduce such values.

Results are provided in table II.

EXAMPLE 3

This example is illustrated by FIG. 2, with results being provided in table III.

EXAMPLE 4

This example is illustrated by FIG. 3. Results are given in table IV.

TABLE I

| | 10a | | 15 | | 17b | | 22c | | 19d | | 24 | |
|---|---|---|---|---|---|---|---|---|---|---|---|---|
| Flow, m.g.d. | 1.0 | | 1.0 | | 1.0 | | 0.1 | | 0.9 | | 0.1 | |
| | $CaCO_3$ | Ion | $CaCO_3$ | Ion | $CaCO_3$ | Ion | $CaCO_3$ | Ion | $CaCO_3$ | Ion | $CaCO_3$ | Ion |
| Composition (p.p.m.): | | | | | | | | | | | | |
| Ca | 300 | 120 | 200 | 80 | | | | | | | 2,000 | 800 |
| Mg | 100 | 24 | 100 | 24 | 9 | 2 | 72 | 17 | 2 | | 965 | 235 |
| Na | 1,000 | 458 | 1,000 | 458 | 1,291 | 593 | 10,288 | 4,730 | 290 | 133 | 7,400 | 3,390 |
| Total cations | 1,400 | | 1,300 | | 1,300 | | 10,360 | | 292 | | 10,365 | |
| $HCO_3$ | 100 | 122 | | | | | | | | | | |
| Cl | 1,200 | 850 | 1,200 | 850 | 1,200 | 850 | 9,560 | 6,788 | 270 | 191 | 9,570 | 6,800 |
| $SO_4$ | 100 | 96 | 100 | 96 | 100 | 96 | 800 | 765 | 22 | 21 | 795 | 766 |
| Total anions | 1,400 | | 1,300 | | 1,300 | | 10,360 | | 292 | | 10,365 | |
| Total dissolved solids | | 1,670 | | 1,508 | | 1,541 | | 12,300 | | 345 | | 11,991 | a = before line 27.  b = before line 21.  c = from vessel 18.  d = before line 20.

TABLE II

| | 10a | | 15 | | 17b | | 22c | | 19d | | 24 | | 20 (Blended) | |
|---|---|---|---|---|---|---|---|---|---|---|---|---|---|---|
| Flow, m.g.d. | 1.0 | | 1.0 | | 1.0 | | 0.075 | | 0.675 | | 0.075 | | 0.925 | |
| | $CaCO_3$ | Ion | $CaCO_3$ | Ion | $CaCO_3$ | Ion | $CaCO_3$ | Ion | $CaCO_3$ | Ion | $CaCO_3$ | Ion | $CaCO_3$ | Ion |
| Composition (p.p.m.): | | | | | | | | | | | | | | |
| Ca | 300 | 120 | 200 | 80 | | | | | | | 2,660 | 1,070 | | |
| Mg | 100 | 24 | 100 | 24 | 15 | 4 | 120 | 32 | 3 | 1 | 1,215 | 298 | 8 | 2 |
| Na | 1,000 | 458 | 1,000 | 458 | 1,285 | 589 | 10,300 | 4,700 | 290 | 133 | 6,475 | 2,960 | 556 | 256 |
| Total cations | 1,400 | | 1,300 | | 1,300 | | 10,420 | | 293 | | 10,350 | | 564 | |
| $HCO_3$ | 100 | 122 | | | | | | | | | | | | |
| Cl | 1,200 | 850 | 1,200 | 850 | 1,200 | 850 | 9,620 | 6,800 | 271 | 192 | 9,555 | 6,810 | 523 | 370 |
| $SO_4$ | 100 | 96 | 100 | 96 | 100 | 96 | 800 | 768 | 22 | 21 | 795 | 765 | 41 | 39 |
| Total anions | 1,400 | | 1,300 | | 1,300 | | 10,420 | | 293 | | 10,350 | | 564 | |
| Total dissolved solids | | 1,670 | | 1,508 | | 1,539 | | 12,300 | | 347 | | 11,903 | | 667 | a = before line 27.  b = before line 21.  c = from vessel 18.  d = before line 20.

TABLE III

| | Line | | | | | | | | | |
|---|---|---|---|---|---|---|---|---|---|---|
| | 10a | | 15 | | 17b | | 22c | | 19d | |
| Flow, m.g.d | 1.0 | | 1.0 | | 1.0 | | 0.1 | | 0.9 | |
| | $CaCO_3$ | Ion | $CaCO_3$ | Ion | $CaCO_3$ | Ion | $CaCO_3$ | Ion | $CaCO_3$ | Ion |
| Composition (p.p.m.): | | | | | | | | | | |
| Ca | 300 | 120 | 200 | 80 | | | | | | |
| Mg | 100 | 24 | 100 | 24 | 5 | 1 | 40 | 8 | 1 | |
| Na | 1,000 | 458 | 1,000 | 458 | 60 | 27 | 478 | 216 | 13 | 6 |
| H | | | | | 1,235 | 25 | 9,859 | 198 | 277 | 6 |
| Total cations | 1,400 | | 1,300 | | 1,300 | | 10,377 | | 291 | |
| $HCO_3$ | 100 | 122 | | | | | | | | |
| Cl | 1,200 | 850 | 1,200 | 850 | 1,200 | 850 | 9,579 | 6,787 | 269 | 191 |
| $SO_4$ | 100 | 96 | 100 | 96 | 100 | 96 | 798 | 766 | 22 | 21 |
| Total anions | 1,400 | | 1,300 | | 1,300 | | 10,377 | | 291 | |
| Total dissolved solids | | 1,670 | | 1,508 | | 999 | | 7,975 | | 224 | a = before line 27.   b = before line 21.   c = from vessel 18.   d = before line 20.

TABLE IV

| | Line | | | | | | | | | |
|---|---|---|---|---|---|---|---|---|---|---|
| | 10a | | 15 | | 17b | | 22c | | 19d | |
| Flow, m.g.d | 1.0 | | 1.0 | | 1.0 | | 0.1 | | 0.9 | |
| | $CaCO_3$ | Ion | $CaCO_3$ | Ion | $CaCO_3$ | Ion | $CaCO_3$ | Ion | $CaCO_3$ | Ion |
| Composition (p.p.m.): | | | | | | | | | | |
| Ca | 300 | 120 | 200 | 80 | 200 | 80 | 1,598 | 639 | 45 | 18 |
| Mg | 100 | 24 | 100 | 24 | 100 | 24 | 799 | 191 | 22 | 5 |
| Na | 1,000 | 458 | 1,000 | 458 | 1,000 | 458 | 7,990 | 3,660 | 252 | 103 |
| H | | | | | 20 | | 160 | 3 | 4 | |
| Total cations | 1,400 | | 1,300 | | 1,320 | | 10,547 | | 296 | |
| $HCO_3$ | 100 | 122 | | | | | | | | |
| Cl | 1,200 | 850 | 1,200 | 850 | 1,317 | 935 | 10,523 | 7,463 | 295 | 210 |
| $SO_4$ | 100 | 96 | 100 | 96 | 3 | 3 | 24 | 24 | 1 | 1 |
| Total anions | 1,400 | | 1,300 | | 1,320 | | 10,547 | | 296 | |
| Total dissolved solids | | 1,679 | | 1,508 | | 1,500 | | 11,980 | | 337 | a = before line 27.   b = before line 21.   c = from vessel 18.   d = before line 20.

What is claimed is:

1. The process for removing inorganic salts from an aqueous solution containing the same, which comprises:
   a. contacting said solution with an ion exchange resin to remove ions present in said solution,
   b. forcing the solution obtained in (a) through a reverse osmosis membrane which rejects and concentrates salts present in said solution,
   c. collecting an aqueous product having an inorganic salt content substantially less than said aqueous solution, and an inorganic salt product, and
   d. regenerating said ion exchange resin of (a) with said inorganic salt product collected in (c).

2. The process for removing inorganic salts from an aqueous solution containing the same, which comprises:
   a. contacting said solution with an ion exchange resin active at a pH of from about 5 to about 14, to remove ions present in said solution,
   b. contacting the solution obtained in (a) with an ion exchange resin active at a pH of from about 1 to about 14, to remove ions present in said last-mentioned solution,
   c. forcing the solution obtained in (b) through a reverse osmosis membrane which rejects and concentrates salts present in said solution,
   d. collecting an aqueous product having an inorganic salt content substantially less than said aqueous solution, and an inorganic salt product, and
   e. regenerating said ion exchange resin of (b) with said inorganic salt product collected in (d).

3. The process of claim 2, wherein the aqueous solution is a brackish water.

4. The process of claim 2, wherein the ion exchange resin of (a) is an acrylic acid resin having carboxylic acid groups.

5. The process of claim 2, wherein the ion exchange resin of (b) is a sodium sulfonate vinyl benzene.

6. The process of claim 2, wherein the membrane of (c) comprises cellulose acetate.

7. The process of claim 2, wherein the membrane of (c) comprises a nylon.

8. The process of claim 2, wherein the ion exchange resin of (a) is regenerated with the stream obtained by regenerating said ion exchange resin of (b) with said inorganic salt product.

9. The process of claim 2, wherein the ion exchange resin of (b) is a vinyl benzene containing a quaternary ammonium substituent.

10. The process for removing inorganic salts from an aqueous solution containing the same, which comprises:
    a. contacting said solution with an ion exchange resin active at a pH of from about 5 to about 14, to remove ions present in said solution,
    b. contacting the solution obtained in (a) with an ion exchange resin active at a pH of from about 1 to about 14, to remove ions present in said last-mentioned solution,
    c. forcing the solution obtained in (b) through a reverse osmosis membrane which rejects salts present in said solution, and
    d. collecting an aqueous product having an inorganic salt content substantially less than said aqueous solution, and an inorganic salt product.

11. The process of claim 1 wherein said inorganic salt product collected in (c) contains an acid component and wherein said ion exchange resin of (a) is regenerated with said acid component.

12. The process of claim 2 wherein said inorganic salt product collected in (d) contains an acid component and wherein said ion exchange resin of (b) is regenerated with said acid component.

* * * * *